United States Patent
Park

(10) Patent No.: US 6,920,157 B1
(45) Date of Patent: Jul. 19, 2005

(54) APPARATUS FOR MULTIPLEXING LINE AND DATA TRANSMISSION METHOD USING THE SAME

(75) Inventor: Ok Bae Park, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/459,984

(22) Filed: Dec. 14, 1999

(30) Foreign Application Priority Data

Dec. 14, 1998 (KR) .......................................... 98/55547

(51) Int. Cl.[7] .................................................. H04J 3/04
(52) U.S. Cl. ...................................... 370/535; 370/389
(58) Field of Search .............................. 370/389, 464, 370/467, 471, 474, 535, 352, 532–534, 536–540, 493–495, 498

(56) References Cited

U.S. PATENT DOCUMENTS

| | | | |
|---|---|---|---|
| 4,455,649 A | | 6/1984 | Esteban et al. ............... 370/80 |
| 4,782,485 A | | 11/1988 | Gollub ....................... 370/118 |
| 5,148,429 A | * | 9/1992 | Kudo et al. ................. 370/9.42 |
| 5,682,386 A | | 10/1997 | Arimilli et al. ............. 370/468 |
| 5,757,801 A | * | 5/1998 | Arimilli ...................... 370/444 |
| 5,764,627 A | * | 6/1998 | Sharma et al. ............... 370/271 |
| 5,790,532 A | * | 8/1998 | Sharma et al. ............... 370/286 |
| 6,285,684 B1 | * | 9/2001 | Suzuki et al. ............... 370/471 |

* cited by examiner

Primary Examiner—Man U. Phan
Assistant Examiner—Toan Nguyen
(74) Attorney, Agent, or Firm—Fleshner & Kim, LLP

(57) ABSTRACT

An apparatus for multiplexing a line and a data transmission method therefor are provided to improve data transmission efficiency. The apparatus for multiplexing a line according to the present invention includes: a plurality of conversion processors for modulating a call processing request signal or transmission data from each user application by a predetermined mode and then demodulating the signal or data to an original data. The apparatus can also process an external incoming call processing request signal or transmission data by a predetermined modulation/demodulation mode and provide the incoming signal to a corresponding user application. The apparatus includes a main controller for processing the call processing request signals provided from the conversion processors, and generating call control data that is added to the at least one header. The main controller is also configured to separate header data included in incoming transmission data. A multiplexing/demultiplexing processor is used for logically multiplexing the call processing request signals or transmission data output from the main controller and for demultiplexing an external multiplexing signal.

30 Claims, 4 Drawing Sheets

APPARATUS FOR MULTIPLEXING LINE AND DATA TRANSMISSION METHOD USING THE SAME

BACKGROUND OF THE INVENTION

1. Field of the Invention

The present invention relates to an apparatus for multiplexing a line, and more specifically, to an apparatus for multiplexing a line and a data transmission method that improves data transmission efficiency.

2. Background of the Related Art

Related art intra-network systems are widely used in accordance with a rapid worldwide development of telecommunications technology. In a related art intra-network system, local area network (LAN) systems connect computers, telephones and facsimile machines. Data communication between various related art intra-networks can be performed wherein an apparatus for multiplexing a line is provided in each intra-network, and wherein each of the respective apparatuses for multiplexing a line are connected by a trunk.

FIG. 1 illustrates operations of the related art apparatus for multiplexing a line, including multiplexing during data transmission and demultiplexing during data reception. When multiplexing during data transmission, an input signal is generated. If the input signal is a voice signal generated from a telephone 10a, a signal from a facsimile machine 10b, or a signal from a modem 10d of a computer 10c, the signal is transmitted to a voice line connector 10 that modulates the signal by a pulse code modulation (PCM) mode and transmits the modulated signal to a multiplexer/demultiplexer 30. Thus, an input signal at 8 Kbps or 14.4 Kbps can be converted to the modulated signal at 64 Kbps.

However, if the input signal is a data signal generated by a computer 20a, the data signal is transmitted to a data line connector 20 that modulates the data signal by the PCM mode and transmits the modulated data signal to the multiplexer/demultiplexer 30.

The multiplexer/demultiplexer 30 respectively assigns channels to the modulated signal from the voice line connector 10 or the data line connector 20 by a time division multiplexing (TDM) mode, and outputs the modulated signal to an output line connector 40 that transmits the modulated and multiplexed signal to a trunk coupled to other apparatuses for multiplexing a line.

The TDM mode divides a number of data or digitized voice signals into a certain time (i.e., time slot) to multiplex a plurality of channels. Therefore, the related art apparatus for multiplexing a line assigns one time channel to each user application, and performs data transmission or reception through that channel. The assigned channel is maintained until the user application terminates data transmission or reception. Thus, during periods that a particular user application is inactive, the data handling capacity assigned to that user application will be wasted.

However, the related art apparatus has various problems and disadvantages. For example, the related art apparatus allows data transmission within a tolerance limit of an overall channel capacity, and when the number of users exceeds a threshold value of the overall channel capacity for a particular time, a standby time period is required for data communication between subscribers in different intra-networks. Additionally, quality of service may deteriorate due to a heavy load on the related art apparatus. To solve this problem, the overall channel capacity can only be increased by increasing the number of the related art apparatuses and the number of trunks, but additional costs and construction work time will result.

SUMMARY OF THE INVENTION

It is an object of the present invention to provide an apparats for multiplexing a line and a data transmission method therefor that substantially obviate one or more of the problems and disadvantages of the related art.

It is another object of the present invention to provide an apparatus for multiplexing a line, and a data transmission method therefor, to improve data transmission efficiency.

It is also an object of the present invention to provide an apparatus for multiplexing a line, and a data transmission method therefor, wherein overall data capacity can increase without a need to increase individual channel capacity, and without a need to increase the number of apparatuses and trunks.

An apparatus for multiplexing a line embodying the present invention includes a plurality of conversion processors for modulating a call processing request signal or transmission data from each user application by a predetermined mode and then demodulating again the signal or data to an original data, or demodulating an externally input call processing request signal or transmission data by a predetermined mode and providing a demodulated signal to a corresponding user application. The apparatus also includes a main controller for implementing the call processing request signal respectively provided from the conversion processors, respectively outputting a call control data added to the transmission data in a header type, and separating header data included in the externally provided transmission data, and a multiplexing/demultiplexing processor for logically multiplexing the call processing request signal or transmission data output from the main controller and demultiplexing an externally provided multiplexing signal.

A data transmission method embodying the present invention uses an apparatus for multiplexing a line that includes a plurality of conversion processors connected with a plurality of user applications, a main controller, and a multiplexing processor. The method includes the steps of: primarily modulating a call processing request signal or transmission data provided from the user applications by a pulse code modulation (PCM) mode and then demodulating the same to an original data; implementing the call processing request signal at the main controller and respectively outputting call control data added to the transmission data in a header type; and logically multiplexing the call processing request signal or transmission data at the multiplexing processor.

Another data transmission method embodying the present invention may also include the steps of: demultiplexing an externally provided multiplexed input signal at the demultiplexing processor; implementing a call processing request signal provided from the demultiplexing processor at the main controller and separating header data included in transmission data provided from the demultiplexing processor; demodulating the signals provided from the main controller at each conversion processor to provide a demodulated signal to a corresponding user application.

An apparatus for multiplexing a line embodying the present invention may include a plurality of conversion processors, wherein each conversion processor is configured to modulate create an interim signal. Each conversion processor would also be configured to demodulate the interim modulated signal to create a secondary original signal. The conversion processor is also configured to demodulate an externally provided signal and to provide the demodulated signal to a corresponding user application. The apparatus also comprises a main controller configured to process call processing request signals from at least one of the conversion processors, to generate call control data that is added to transmission data in at least one header field, and wherein the main controller is configured to separate header data included in an externally provided signal. The apparatus further comprises a multiplexing/demultiplexing processor configured to logically multiplex signals output from the main controller, and to demultiplex an externally provided signal.

A data transmission method embodying the present invention comprises the step of modulating a call processing request signal or transmission data provided from a user application by a pulse code modulation (PCM) mode to create an interim modulated signal, and demodulating the interim modulated signal to create a secondary signal. The method also comprises the steps of processing a call processing request signal from the conversion processor with a main controller that is coupled to the conversion processor to generate call control data that is added to transmission data in at least one header field, and logically multiplexing signals output from the main controller with a multiplexing processor, wherein the multiplexing processor is coupled to the main controller.

A data transmission method embodying the present invention may also comprise the steps of demultiplexing externally provided multiplexed input signals with a demultiplexing processor, processing a call processing request signal transmitted from the demultiplexing processor with a main controller coupled to the demultiplexing processor, and separating header data included in the call processing request signal provided from the demultiplexing processor. The method further comprises the step of demodulating signals provided from the main controller with one of a plurality of conversion processors to transmit the signal to a corresponding user application, wherein each of the plurality of conversion processors is coupled to the main controller and the corresponding user application.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings, in which like reference numerals refer to like elements, and wherein.

DETAILED DESCRIPTION OF PREFERRED EMBODIMENTS

Figure 1:
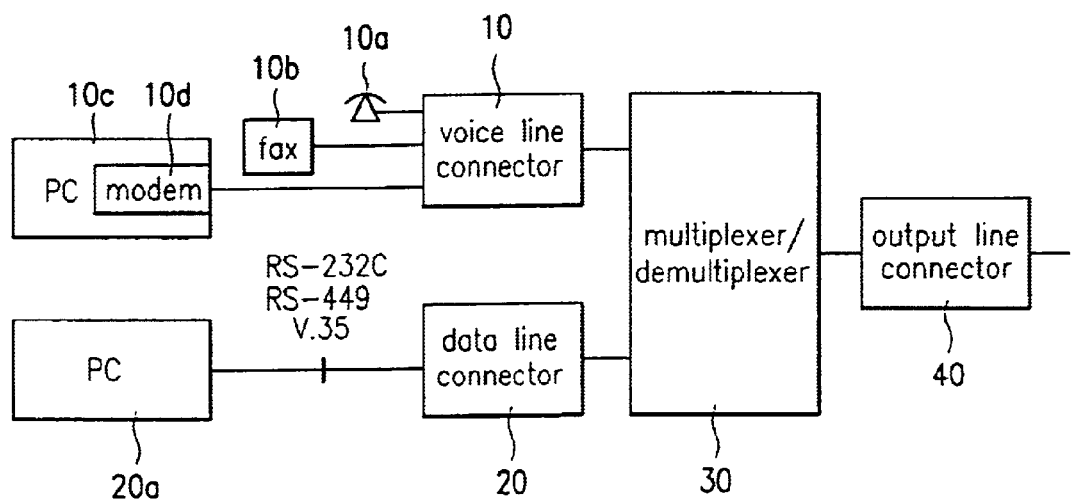
FIG. 1 illustrates s a block diagram of a related art apparatus for multiplexing a line.
Figure 2:
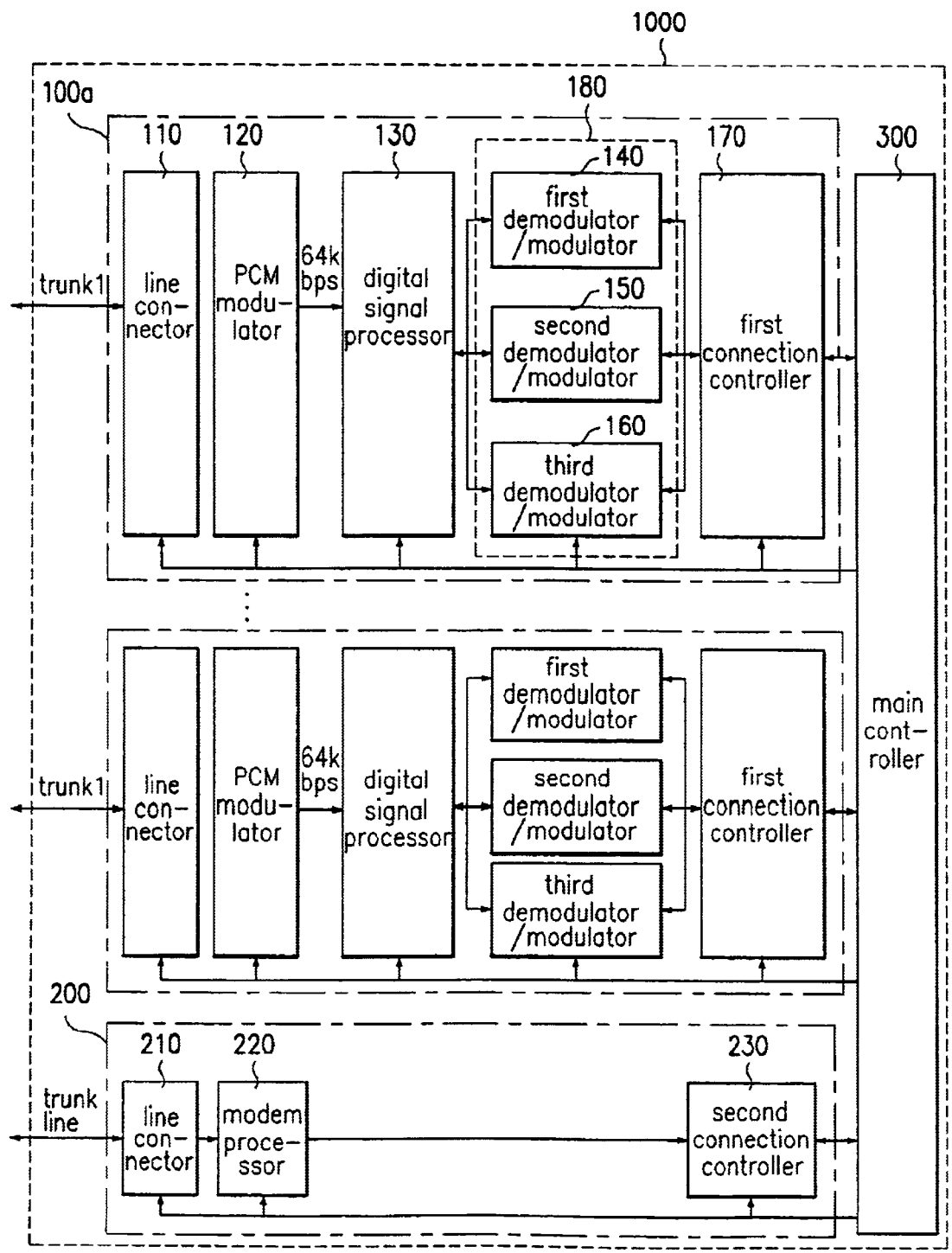
FIG. 2 illustrates a block diagram of an apparatus for multiplexing a fine according to a preferred embodiment of the present invention.

FIG. 2 illustrates a block diagram of a first apparatus 1000 for multiplexing a line according to a preferred embodiment of the present invention. The first apparatus 1000 includes a plurality of conversion processors 100a~100n coupled to a main controller 300, which is coupled to a multiplexing/demultiplexing processor 200. The plurality of conversion processors 100a~100n can modulate an original outgoing signal, for example a call processing request signal or transmission data from various user applications such as telephones, facsimile machines and/or computers using PCM modulation. The conversion processors 100a~100n also demodulate incoming call processing request signals or transmission data back to the original signal. Thus, the first apparatus 1000 can process call processing request signals or transmission data from a second apparatus having substantially similar features as the first apparatus 1000, which are received through a trunk, using PCM type demodulation, and provide the demodulated signal to a corresponding user application.

The main controller 300 in the first apparatus 1000 receives call processing request signals transmitted by the conversion processors 100a~100n, and outputs call control information that is added to transmission data in a header. Additionally, when receiving incoming signals, the main controller 300 can separate the header from the transmission data provided by a second apparatus. The multiplexing/demultiplexing processor 200 logically multiplexes outgoing call processing request signals or transmission data transmitted by the main controller 300, and demultiplexes the incoming multiplexed signals provided by a second apparatus through a trunk.

Figure 3:
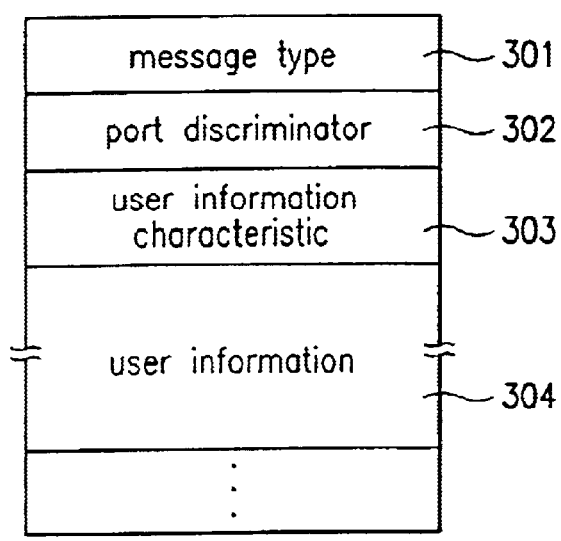
FIG. 3 illustrates a call control information type used in the preferred embodiment of the present invention.

FIG. 3 illustrates the format of call control information used in the preferred embodiment of the present invention. The data format includes a message type field 301 indicative of one of setting, release and maintenance of a call, a port discriminator field 302 indicative of discriminators of the conversion processors 100a~100n, a user information characteristic field 303 including information corresponding to a signal type (e.g., voice signal, facsimile or data signal, or data coding mode of a user application, modem mode, or communication line speed) and a user information field 304. The call control information is entered into the header by the main controller 300.

While the preferred embodiment of the present invention can be used for voice, facsimile, and computer signals, the present invention is not limited to those signals. For example, pager, cellular, or other communications signals may be used in various embodiments of the present invention.

As illustrated in FIG. 2, each of the conversion processors 100a~100n further includes a first line connector 110 that can communicate with the user application, a PCM modulator 120 that can modulate a signal transmitted from the first line connector 110 by the PCM mode, and a digital signal processor 130 that can determine a type of a signal provided from the PCM modulator 120 and can output the provided signal to a path corresponding to the determined signal type. The conversion processors 100a~100n also include a modulating/demodulating portion 180 that can demodulate signals transmitted from the digital signal processor 130 and modulate signals provided from the main controller 300. The conversion processors 100a~100n also include a first connection controller 170 that can control signals output from the demodulating/modulating portion 180 to the main controller 300 and produce a serial signal.

The demodulating/modulating portion 180 includes a first demodulator/modulator 140 that can demodulate an outgoing voice signal output from the digital signal processor 130 to an original voice signal, or modulate an incoming voice signal provided from the main controller 300. A second demodulator/modulator 150 can demodulate a facsimile signal output from the digital signal processor 130 to the original facsimile signal, or modulate an incoming facsimile signal provided from the main controller 300. A third demodulator/modulator 160 can demodulate a data signal output from the digital signal processor 130 to an original data signal, or modulate an incoming data signal provided from the main controller 300.

The multiplexing/demultiplexing processor 200 includes a second connection controller 230 that can control the call processing request signal and transmission data provided from the main controller 300 to produce a serial signal. The multiplexing/demultiplexing processor 200 also includes a modem processor 220 that can convert an outgoing signal output from the second connection controller 230 to an analog signal, and a second line connector 210 coupled to the modem processor 220 that can communicate with a second apparatus through a trunk line.

Call setting between the multiplexing/demultiplexing processor 200 and the conversion processors 100a~100n is accomplished by a method according to a preferred embodiment of the present invention. If a user application requests call processing relating to setting, maintenance and release of a call using telephones, key-phones and a private branch exchange (PBX), each user application requests a call processing using a loop dial (LD) mode, an ear and mouth (E&M) mode or a tip/ring(T/R) mode common to the telephone. The call processing request signal is then transmitted to one of the conversion processors 100a~100n provided in the first apparatus 1000 through a corresponding line. The corresponding conversion processor (e.g., 100a) transmits the call processing request signal to the main controller 300 to implement the user's desired call processing operation.

The call processing request signal processed by the main controller 300 is then transmitted to the second line connector 210 through the second connection controller 230 and the modem processor 220. Next, the main controller 300 matches a signal mode of the first line connector 110 of the conversion processor 100a to a signal mode of the second line connector 210 if the signal mode of the first line connector 110 and the second line connector 210 substantially differ.

The call processing request signal is transmitted from the second line connector 210 through a trunk coupled to a second apparatus. The main controller 300 of the first apparatus 1000 implements the call processing operation if the second apparatus sends back a response signal. If two or more users transmit call processing request signals or transmission data at a substantially same time, the main controller 300 controls the call control information of the types shown in FIG. 3 to add the call control information to the originating user information in the header.

If a call is set up between the first apparatus 1000 for the origination party and the second apparatus for the termination party, the user application at the origination party initially transmits the user information through a port of the conversion processor (e.g., 100a). Then, the first line connector 110 of the conversion processor 100a communicates with the user application and receives an analog signal of 8 Kbps or 14.4 Kbps.

The PCM modulator 120 then modulates the analog signal received in the conversion processor 100a to a digital signal of 64 Kbps and transfers the modulated signal to the digital signal processor 130, which analyzes the digital signal output from the PCM modulator 120 to determine whether the signal transmitted to the conversion processors 100a~100n is a voice signal, a facsimile signal or a data signal.

If the input signal is a digital voice signal, the digital signal processor 130 can apply the input signal to the first demodulator/modulator 140 to demodulate the digital voice signal to the original voice signal. If the input signal is a digital facsimile signal, the digital signal processor 130 can apply the input signal to the second demodulator/modulator 150 to demodulate the digital facsimile signal to the original facsimile data. If the input signal is a digital data signal, the digital signal processor 130 can apply the input signal to the third demodulator/modulator 160 to demodulate the digital data signal to the original data signal. Thus, the digital signal of 64 Kbps is demodulated to the original analog signal of 8 Kbps or 14.4 Kbps, such that if the digital signal of 64 Kbps is demodulated to the analog signal of 8 Kbps, then eight users can simultaneously use one channel.

The transmission data output from the first through third demodulators/modulators 140, 150 and 160 are converted to serial data by the first connection controller 170. The main controller 300 adds the call control information shown in FIG. 3 to the serial data output from the first connection controller 170 in a header.

The main controller 300 transmits the serial data, including header data, from the first connection controller 170 to the modem processor 220 through the second connection controller 230 of the multiplexing/demultiplexing processor 200. The modem processor 220 converts the serial data, including header data, to an analog signal and inputs the analog signal to the second line connector 210 of the multiplexing/demultiplexing processor 200. The transmission data of the analog signal in the second line connector 210 is then transmitted to the second apparatus at the termination party through the trunk.

Figure 4:
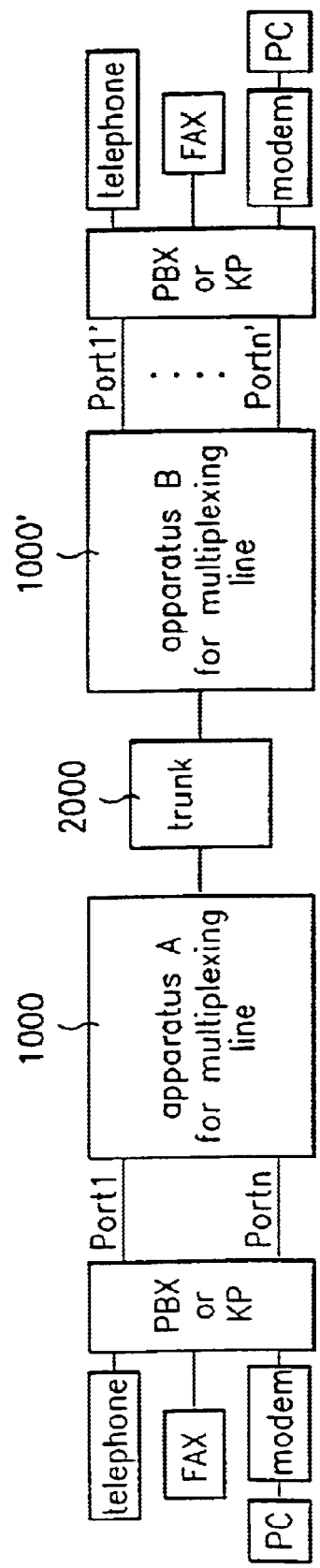
FIG. 4 illustrates data communication wherein two apparatuses for multiplexing a line according to the preferred embodiment of the present invention are coupled to each other through a trunk.

FIG. 4 illustrates data communication according to a preferred embodiment of the present invention, wherein the first and the second apparatuses 1000, 1000' are coupled to each other through the trunk 2000.

The first apparatus 1000 is the origination party, the second apparatus 1000' is the termination party, and the first and second apparatuses 1000, 1000' have a substantially identical internal construction. The procedures for receiving data transmitted through the trunk 2000 to the second apparatus 1000' are described below.

First, the transmission data of an analog signal type is transmitted to the second apparatus 1000', at the second line connector 210 of the multiplexing/demultiplexing processor 200 coupled to the trunk 2000. The analog signal transmitted to the second line connector 210 is then converted to digital data by the modem processor 220, and the digital data is converted to serial digital data by the second connection controller 230. The main controller 300 receives the serial digital data from the second connection controller 230 and separates the call control information added to user information illustrated in FIG. 3 in the header.

After the main controller 300 separates the call control information in the header, the main controller 300 transmits user information of a serial digital data type to the digital signal processor 130. The digital signal processor 130 demodulates the signal by the PCM mode to generate an analog signal, which is transmitted to the respective user application (e.g., telephone, facsimile machine and computer modem) through the conversion processor 100a corresponding to information contained in the port discriminator field 302 in the call control information shown in FIG. 3.

The embodiments of the apparatus for multiplexing a line and methods therefor according to the present invention have various advantages. For example, in case of data communication between subscribers of different intra-networks having the apparatus for multiplexing a line, the transmission data is demodulated to original data and then transmitted, which increases overall channel capacity greatly without increasing individual channel capacity. Thus, even if the number of subscribers increases or the use of a line concentrates for a particular period of time, transmission efficiency of the trunk can be improved without increasing the number of apparatuses and trunks.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for multiplexing a line, comprising:
    a plurality of conversion processors, wherein each conversion processor is configured to modulate a communication signal provided by a user application to create an interim modulated signal, analyze the interim modulated signal to determine a type of communication signal and to route the analyzed interim modulated signal according to the type of communication signal, and demodulate the routed interim modulated signal to create a secondary original signal based on the type of communication signal, wherein secondary original signals of multiple user applications can be assigned to a channel;
    a main controller configured to process the secondary original signals provided from at least one of the conversion processors; and
    a multiplexing/demultiplexing processor configured to logically multiplex processed signals output from the main controller and to demultiplex an externally provided signal.

2. The apparatus of claim 1, wherein each conversion processor comprises:
    a pulse code modulation (PCM) modulator configured to modulate the communication signal by a PCM mode to create the interim modulated signal;
    a digital signal processor configured to determine the type of interim modulated signal provided from the PCM modulator and to output the interim modulated signal to a path corresponding to the determined type; and
    a demodulating/modulating portion configured to demodulate the interim modulated signal provided from the digital signal processor to create the secondary original signal.

3. The apparatus of claim 2, wherein each conversion processor also includes a first line connector, configured to communicate with a user application, that is coupled to the PCM modulator.

4. The apparatus of claim 2, wherein the demodulating/modulating portion comprises:
    a first demodulator/modulator configured to demodulate a first type of communication signal output from the digital signal processor to create a first type of secondary original signal;
    a second demodulator/modulator configured to demodulate a second type of communication signal output from the digital signal processor to create a secondary original signal; and
    a third demodulator/modulator configured to demodulate a third type of communication signal output from the digital signal processor to create a third type of secondary original signal.

5. The apparatus of claim 4, wherein the first demodulator/modulator is further configured to modulate a first type of communication signal provided from the main controller, wherein the second demodulator/modulator is further configured to modulate a second type of communication signal provided from the main controller, and wherein the third demodulator/modulator is configured to modulate a third type of communication signal provided from the main controller.

6. The apparatus of claim 1, wherein each conversion processor also includes a first connection controller configured to generate a serial signal, based on the secondary original signal, and to output the serial signal to the main controller.

7. The apparatus of claim 1, wherein the multiplexing/demultiplexing processor comprises a modem processor for converting a call processing request signal and transmission data provided from the main controller to analog signals.

8. The apparatus of claim 7, further comprising a second line connector configured to process communications with an external apparatus, wherein the second line connector is coupled to the modem processor.

9. The apparatus of claim 7, further comprising a second connection controller for controlling signals provided from the main controller to the modem processor.

10. The apparatus of claim 1, wherein the communication signal is one of a call processing request signal and transmission data.

11. The apparatus of claim 10, wherein the main controller is further configured to receive call processing request signals provided from at least one of the conversion processors to generate call control data that is added to transmission data in at least one header field.

12. The apparatus of claim 11, wherein the main controller is configured to separate a header data included in an externally provided signal.

13. The apparatus of claim 11, wherein the call control data comprises at least one of a message type, a port discriminator, a user information, and a characteristic information.

14. The apparatus of claim 13, wherein the message type is one of setting, release and maintenance of a call.

15. The apparatus of claim 13, wherein the port discriminator is indicative of a discriminator of one of the conversion processors.

16. The apparatus of claim 15, wherein the characteristic information includes at least one of a signal type, a data coding mode of the user application, a modem mode and information for a communication line speed.

17. The apparatus of claim 1, wherein each conversion processor is also configured to demodulate an externally provided signal and to provide the demodulated signal to a corresponding user application.

18. A data transmission method comprising:
    modulating a communication signal provided from a user application using a conversion processor to create an interim modulated signal;

determining a type of communication signal that was modulated to create the interim modulated signal;

demodulating the interim modulated signal with a demodulator having a path set to correspond with the determined type of communication signal, wherein a channel can simultaneously transmit demodulated signals of more than one user application;

processing a signal from the conversion processor using a main controller that is coupled to the conversion processor; and logically multiplexing signals output from the main controller with a multiplexing processor.

19. The method of claim 18, wherein a first type of communication signal is a voice signal, a second type of signal is a facsimile signal, and a third type of communication signal is a data signal.

20. The method of claim 18, further comprising controlling the conversion processor with the multiplexing processor to match their respective signal transmission modes.

21. The method of claim 18, wherein the communication signal is one of a call processing request signal and transmission data.

22. The method of claim 18, wherein processing a signal from the conversion processor using a main controller that is coupled to the conversion processor comprises processing a call processing request signal from the conversion processor using a main controller that is coupled to the conversion processor to generate call control data that is added to transmission data in at least one header field.

23. The method of claim 22, wherein the call control data includes at least one of a message type, a port discriminator, user information, and a user characteristic information.

24. The method of claim 23, wherein the message type is one of a setting, a release and a maintenance of a call.

25. The method of claim 23, wherein the port discriminator is indicative of a conversion processor coupled to a corresponding user application.

26. The method of claim 23, wherein the user characteristic information includes at least one of a signal type, a data coding mode of the user application, a modem mode and information for a communication line speed.

27. The method of claim 18, wherein modulating a communication signal provided from a user using a conversion processor to create an interim modulated signal comprises modulating a communication signal provided from a user using a conversion processor to create an interim modulated signal using a pulse code modulation (PCM) mode.

28. A data transmission method comprising:

demultiplexing an externally provided multiplexed input signal using a demultiplexing processor;

processing signals transmitted from the demultiplexing processor using a main controller coupled to the demultiplexing processor; and modulating the processed signals based on a type of the communication signal and then demodulating the modulated signals using one of a plurality of conversion processors to transmit the signals respectively to a corresponding user application, wherein each of the plurality of conversion processors is coupled to the main controller and a corresponding user application, and wherein each of the plurality of conversion processors comprises a first demodulator/modulator configured to modulate a first type of communication signal provided from the main controller, a second demodulator/modulator configured to modulate a second type of communication signal provided from the main controller, and a third demodulator/modulator configured to modulate a third type of communication signal provided from the main controller.

29. The method of claim 28, wherein processing signals transmitted from the demultiplexing processor using the main controller comprises processing call processing request signals transmitted from the demultiplexing processor using the main controller.

30. The method of claim 29, further comprising separating header data included in the call processing request signal provided from the demultiplexing processor.

* * * * *